United States Patent [19]

Cooper et al.

[11] Patent Number: 4,948,457
[45] Date of Patent: Aug. 14, 1990

[54] DIFFUSION BONDING OF ALUMINUM AND ALUMINUM ALLOYS

[75] Inventors: Graham A. Cooper; Ian E. Bottomley, both of Preston, United Kingdom

[73] Assignee: British Aerospace PLC, London, United Kingdom

[21] Appl. No.: 373,492

[22] Filed: Jun. 30, 1989

[30] Foreign Application Priority Data

Jul. 1, 1988 [GB] United Kingdom ............... 8815663

[51] Int. Cl.$^5$ .......................... B44C 1/22; C23F 1/00; C03C 15/00; C03C 25/06
[52] U.S. Cl. .................................. 156/629; 156/645; 156/665; 227/196; 227/206
[58] Field of Search ................................ 156/629-630, 156/634, 645-656, 664-665, 153; 228/193, 194, 195, 196-199, 202, 206

[56] References Cited

U.S. PATENT DOCUMENTS 3,817,844  6/1974  Kendall ................................. 204/15
4,361,262 11/1982  Israeli .................................. 228/118

OTHER PUBLICATIONS

D. Hauser, et al. Fundamentals of Solid State Welding and Their Application to Beryllium, Aluminum, and Stainless Steel; Jul. 15, 1965; Table 1, p. 9; p. 65; pp. 74–75; Table X on p. 80.
S. B. Dunkerton, et al. The Application of Diffusion Bonding and Laser Welding in the Fabrication of Aerospace Structures; p. 2; Concluding Remarks, p. 5.
I. M. Barta, Low Temperature Diffusion Bonding of Aluminum Alloys (Welding Research); Jun. 1964; 1st par., p. 243; 6th and 7th pars. of Conclusion p. 247.

Primary Examiner—William A. Powell
Attorney, Agent, or Firm—Kerkam, Stowell, Kondracki & Clarke

[57] ABSTRACT

The present invention provides a process in which components made of aluminum or an alloy thereof can be diffusion bonded together; the process involves chemically treating the components to remove aluminum oxide on the surface of the components, subjecting them to grit blasting and to a second chemical oxide removal step and finally pressing the components together under heat until they form diffusion bonds. The resulting composite can be superplastically formed to shape.

20 Claims, 2 Drawing Sheets

DIFFUSION BONDING OF ALUMINUM AND ALUMINUM ALLOYS

The present invention relates to a technique of diffusion bonding aluminium and aluminium alloys to form a composite structure.

Diffusion bonding is an extremely valuable technique in joining components, particularly in the aircraft industry, and involves the pressing together of heated components so that the atoms in the components inter-diffuse to form a metal-to-metal bond. Diffusion bonding can be combined with superplastic forming, which is a technique in which a heated metal is subject to slow deformation during which the metal stretches, and is thinned out, in the deformed areas but does not neck or fracture.

Aluminium and many of its alloys have an extremely tenaceous surface oxide that prevents diffusion bonding; because of the physical properties of aluminium (low density, high strength), it is ideal for use in the aircraft industry but its inability to be formed into a composite structure by diffusion bonding has caused some design limitations.

The surface oxide on aluminium forms quickly even at very low partial pressures of oxygen and so it has not proved feasible to remove the oxide and maintain a totally oxide-free surface prior to bonding.

There have been several proposals for diffusion bonding of aluminium as follows:

(i) removing or disrupting the oxide film in-situ as part of the bonding process [see Metrigger, Welding Journal, January 1978, pages 37–43];

(ii) the application of a coating to the surface which will help prevent oxidation of the aluminum surface prior to bonding, and then will diffuse away from the interface (see GB Nos. 1 533 522; 1 485 051; 2 167 329, 2 117 691 and 1 544 201); or (iii) the application of a coating which will form a liquid phase at the bond interface which may help disrupt the oxide film and act as a carrier for atoms to diffuse across the interface.

British Pat. Nos. 1,488,984 and 998 081 claim that good diffusion bonding can be achieved between an aluminum component and a component made of another metal by mechanical working of the components which involves passing them between rollers to reduce their thickness by 20–70%. However, such working adds to the complication and expense of the processes and makes it difficult to obtain a precisely-dimensioned final product; it is an object of the present invention to provide a diffusion bonding process that does not require any substantial plastic deformation of the components during the diffusion bonding step.

We have now discovered that extremely good diffusion bonding of aluminium can be achieved without substantial plastic deformation of the components by means of a specific mechanical and chemical pretreatment.

According to the present invention, there is provided a process of diffusion bonding components, at least one of which is made of aluminium or of an aluminium alloy and has a protective surface coating of aluminium oxide, the process comprising grit blasting the component or components made of aluminium or aluminium alloy, chemically treating the grit blasted component(s) in the grit blasted areas to remove surface aluminium oxide, and subsequently pressing the components together without substantial plastic deformation of the components while heating them to produce a diffusion bond between the components.

The chemical treatment of the grit blasted components may be performed using any chemical that is effective to remove all or part of the surface oxide, e.g. a deoxidising composition, which may be a non-oxidising acid; we prefer to use a non-chromated composition such as Alprep 290, which is commercially available from Lee Chemicals of Buxton, U.K. and which is described as "a non-chromated deoxidiser/desmutter".

The delay between the end of the surface preparation and the diffusion bonding process is important and should be less than 1 hour and preferably less than 20 minutes to prevent re-formation of a thick oxide layer. Likewise, the components should not be left between the individual steps of the surface preparation for more than 1 hour for the same reason.

Preferably, the components are subjected to a step prior to the grit blasting step in which the layer of oxide on the the aluminium component is removed chemically and this can be done by any chemical means that is effective to removal all or part of the oxide layer, for example by means of a deoxidation solution, such as ALPREP 290, by means of an acid etch, e.g. using sulphuric and/or chromic acids. The oxide layer will re-form immediately after the oxide removal treatment but we have found that by conducting the grit blasting step within one hour of the end of the chemical treatment step, the resulting oxide layer will be thinner than prior to the treatment and so the use of a preliminary chemical oxide removal step shows advantages.

The chemical oxide removal both prior to the after grit blasting may be done in an ultrasonic cleaner to improve the action of the chemical oxide remover.

Grit blasting is a technique in which small particles of stone, sand, alumina or rock (or particles of comparable hardness, e.g. chilled iron grit) entrained in a flow of air (or other gas) are directed at the aluminium surface. The precise conditions and duration of the grit blasting will have to be discovered empirically since the optimum process parameters depend on the hardness and size of the grit and the speed of the grit particles on impact against the metal components. The rougher the surface finish produced by grit blasting, the greater is the degree of plastic deformation of the surface microasperities produced by the grit and the greater is the disruption of the surface oxide layer which leads to greater diffusion bond strength. However, there are other factors that must be considered when increased surface deformation by blasting arises:

(a) grit blasting leads to grain coarsening at the diffusion bond interface causing a reduction in bond strength; and (b) as the duration and/or the aggressiveness of the blasting process increases so the amount of grit and aluminium oxide trapped in the surface of the components will increase which tends to weaken the bonds.

The optimum blasting conditions will be a compromise between the above conflicting factors and will depend on the type of abrasive used, the speed of the entraining gas and the conditons used for the blasting.

One important property of a composite article made by diffusion bonding components is the peel strength of the diffusion bonds since if this is low the composite article will not withstand superplastic forming because the components will peel apart. In certain tests we have achieved a diffusion bond that has a cold peel strength that is almost the same as unbonded parent metal. This is most surprising since it has so far proved impossible to produce commercially a composite aluminium article formed by a combined superplastic forming/diffusion bonding process.

It is not necessary to grit blast and chemically treat those areas of the components that are not going to be diffusion bonded together in the above fashion but, if more convenient, the whole of the component(s) may subjected to the above-described pre-treatment. Also, it is only necessary to pre-treat those components that have a surface oxide layer.

FIG. 3b is a cross-sectional view through a panel that has been superplastically formed from the panel shown in FIG. 1a.

The process of the present invention will now be described in greater detail by way of example only in the following Examples:

EXAMPLE 1

70×70 mm panels of alloy 8090, (which is commercially available from British Alcan and is an aluminium,-lithium alloy having a composition: Li 2.2-2.7; Cu1.-0-1.6, Mg 0.6-1.3, Zr 0.04-0.16, Zn 0.25 max, Fe 0.3 max, Si 0.2 max, Mn 0.1 max, Cr 0.1 max, Ti 0.1 max, with the balance being aluminium) were subject to a three-stage surface preparation involving removal of the oxide layer from both panels using either an acid etch (e.g. sulphuric and/or chromic acid) or a deoxidising solution such as Alprep 290. The panels were then grit blasted using various grit sizes and finally they were immersed in a solution of Alprep 290 deoxidising solution in an ultrasonic cleaner for five minutes in order to dislodge any trapped grit and to remove any oxide which may have built up on the prepared surface. The panels were then rinsed with distilled water and dried with acetone.

Figure 1:
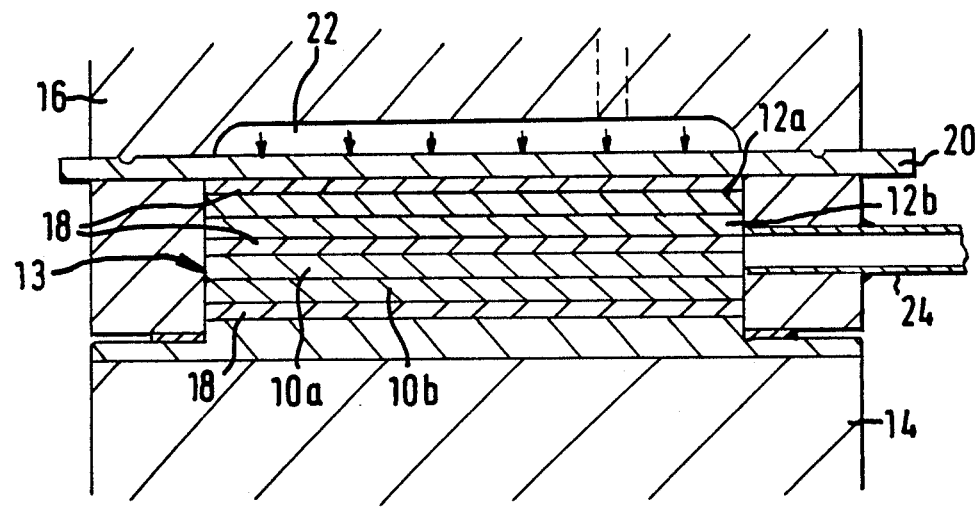
FIG. 1 is a cross-sectional view of an apparatus for diffusion bonding components for use in the process of the present invention.

Within 1 hour, the panels were subject to a diffusion bonding treatment in the apparatus shown in FIG. 1, which is a sectional view. In the apparatus, two pairs of sample panels 10a and 10b and 12a and 12b are diffusion bonded by the following procedure: The pairs of sample plates are placed in the cavity 13 between a bottom tool 14 and a top tool 16, spacers 18 being placed between one pair of plates and the other and also above and below the plates (as shown) to form a bonding pack. The pack is situated in the cavity 13 below a diaphragm 20 made of Supral alloy which is an alloy that can be deformed superplastically under heat and pressure. A space 22 above the diaphragm 20 communicates with a pump that can exert gas pressures on the diaphragm of 1000 pounds per square inch (6.9 kPa). A pipe 24 is connected to a vacuum pump to evacuate the part of the cavity below the diaphragm containing the bonding pack in order to minimise further oxidation during diffusion bonding. Heaters (not shown) are provided in the wall of the top tool 16 that can heat the panels.

Sample panels were loaded into the apparatus of FIG. 1 and heated to a temperature of 530° C. or 560° C. while a vacuum was applied through pipe 24. Gas at 1000 psi was supplied to space 20 which acted on the diaphragm 20 and compressed the bonding pack. After the temperature and pressure had been maintained for the desired time, the gas pressure in space 20 was released and the top tool 16 was lifted away from the bottom tool 14; the bonded panels were then allowed to cool in air.

Other pre-treatments were conducted prior to diffusion bonding and these are set out in Table 1.

Figure 2:
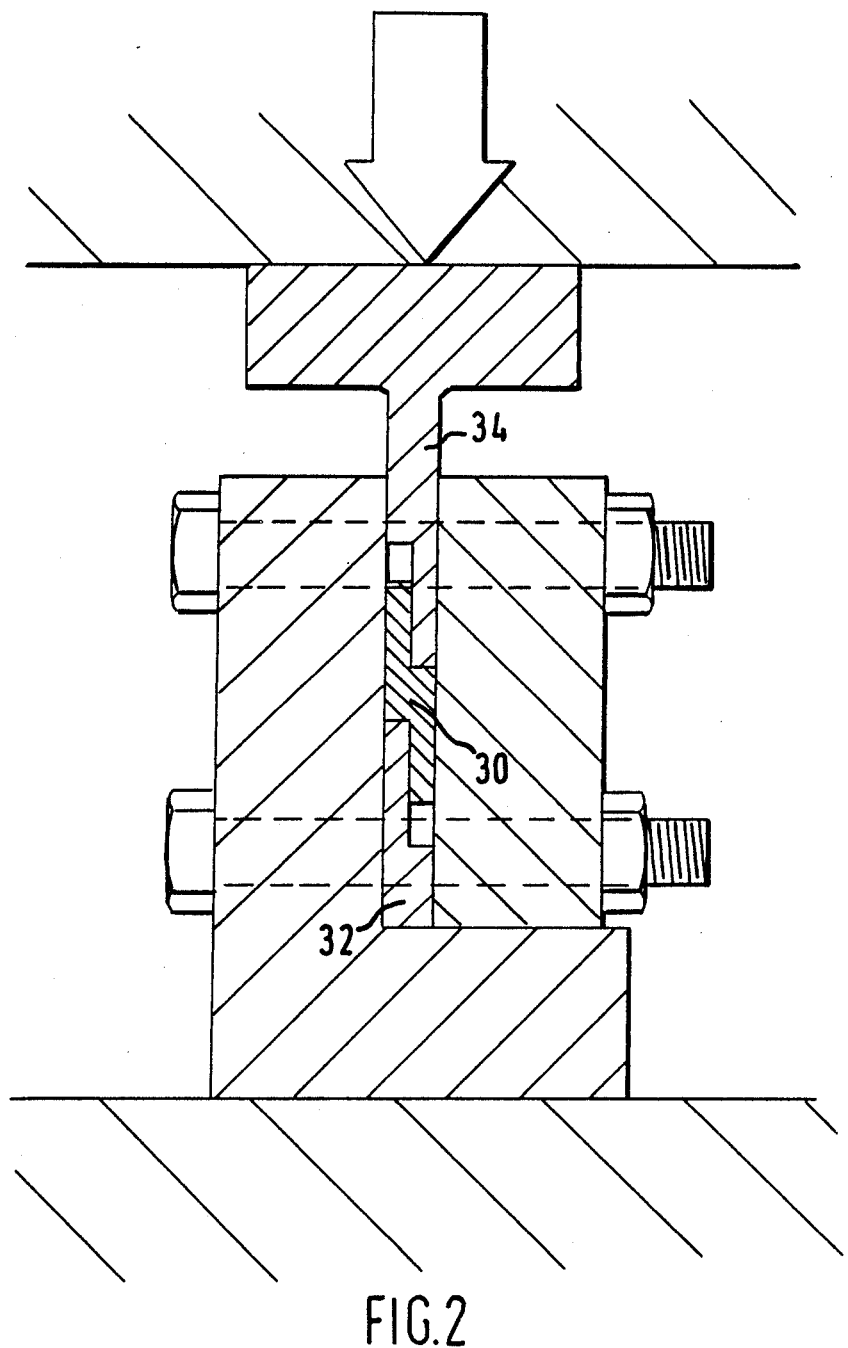
FIG. 2 is a cross-sectional view of an apparatus for testing the shear strength of diffusion-bonded sample panels produced by the process of the present invention, the apparatus being shown in the process of testing a sample panel.

Specimens for testing were then machined from the bonded panels. One of the specimens 30 is shown in FIG. 2 installed in a rig to test the lap shear strength of the sample. The specimen, which was 20 mm wide and 27 mm long and has an overlap length of 7 mm, was compressed between fixed jaw 32 and movable jaw 34 until it failed; the force at which the specimen failed was its lap shear strength. The results are shown in Table 1.

In a further test, a wedge was forced into a specimen machined from the bonded panel along the line of the bond and the force at which the wedge could separate the two plates along a given distance was recorded as its cold peel strength.

Microsections of the bonded plates were taken for each test and categorised as follows:

1: continuous planar oxide at bond interface.
2: oxide layer broken in a few places but otherwise continuous.
3: discontinuous non-planar oxide broken and dispersed in a band 30–70 microns along the bond line.
4: interface barely distinguishable. Oxide broken and dispersed in band 30 microns wide along bond line.
5: interface almost indistinguishable. Slight grain coarsening and a few small areas of broken oxide along bond line.

The results are shown in the following Table 1:

| Test | Surface Treatment* | Bonding Temp(°C.)/ Duration (hours) | Micro-Section Category | Shear Strength (mPa) | Peel Strength** (KN/m) |
|---|---|---|---|---|---|
| 1 | A | 560/6 | 3 | 171 | 35.0 |
| 2 | A | 560/6 | 3 | 170 | 10.0 |
| 3 | A | 560/6 | 3 | 180 | 16 0 |
| 4 | A | 560/6 | 3 | 174 | 22.5 |
| 5 | A | 560/6 | 3 | 165 | 36.5 |
| 6 | A | 560/6 | 3 | 177 | 12.0 |
| 7 | A | 560/6 | 3 | 177 | 10.5 |
| 8 | A | 560/6 | 3 | 177 | — |
| 9 | D | 560/6 | 1 | 70 | Brittle |
| 10 | E | 560/6 | 1 | 137 | 11.0 |
| 11 | C | 560/5 | 3 | 164 | 10.0 |
| 12 | C | 560/5 | 3 | 143 | 10.0 |
| 13 | C | 560/5 | 3 | 177 | 27.5 |
| 14 | C | 560/5 | 3 | 174 | 27.5 |
| 15 | B | 560/5 | 3 | 165 | 10.5 |
| 16 | B | 560/6 | 3 | 170 | 15.0 |
| 17 | B | 560/6 | 3 | 172 | 19.0 |
| 18 | B | 560/6 | 2 | 121 | 11.0 |
| 19 | B | 560/6 | 2 | 24 | Brittle |
| 20 | B | 560/3 | 4 | 156 | 42.5 |
| 21 | B | 560/3 | 4 | 157 | 27.5 |
| 22 | B | 560/1 | 4 | 143 | 25.0 |
| 23 | B | 560/1 | 4 | 160 | 225 |
| 24 | B | 560/3 | 4 | 165 | 47.5 |
| 25 | B | 560/3 | 4 | 157 | 40.0 |
| 26 | B | 560/3 | 4 | 163 | 35.0 |
| 27 | B | 560/3 | 5 | 166 | Parent |
| 28 | B | 560/3 | 5 | 167 | Parent |
| 29 | B | 530/3 | 4 | 149 | 22.5 |
| 30 | B | 530/3 | 4 | 165 | 20.0 |

-continued

| Test | Surface Treatment* | Bonding Temp(°C.)/ Duration (hours) | Micro-Section Category | Shear Strength (mPa) | Peel Strength** (KN/m) |
|---|---|---|---|---|---|
| 31 | B | 530/6 | 4 | 159 | 20 0 |
| 32 | F | 560/6 | 1 | — | Brittle |
| 33 | G | 560/6 | 1 | 167 | Brittle |
| 34 | H | 560/6 | 3 | 185 | 18.5 |
| 35 | B | 560/3 | 5 | 182 | Parent |
| 36 | B | 560/3 | 5 | 185 | Parent |
| 37 | B | 560/3 | 5 | 184 | Parent |
| 38*** | B | 520/3 | 5 | 225 | Parent |
| 39*** | B | 520/3 | 5 | 217 | Parent |

*Treatment
A: Acid etch/grit blast/deoxidise
B: Deoxidise/grit blast/deoxidise
C: Deoxidise/grit blast
D: Deoxidise/bead blast/deoxidise
E: Deoxidise/shot blast/deoxidise
F: acid etch
G: Rubbed with Emmery Paper (120 grit) and degreased
H: Grit blasted
N.B. Treatments D, E, F, and G are not in accordance with the present invention.
**Brittle = bond is so brittle the cold strength could not be measured, and Parent = cold peel strength is the same as parent metal.
***Aluminium zinc alloy 7475E was used in Tests 38 and 39.

Deoxidisation was carried out with Alprep 290; the acid etch was conducted with a mixture of chromic and sulphuric acids.

The shear strength of parent alloy 8090 was 198 MPa.

The fracture faces of the cold peel (wedge) test specimens were examined and, except for tests 27 28 and 35 to 39, all specimens had fractured along the original bond interface. Tests 27, 28 and 35 to 39 showed non-planar fractures deviating from the interface and passing through the parent metal.

The fracture faces of the shear test specimens (except test 32 and 35 to 39) were also examined. Tests 3 to 6, 9, 10, 15, 16, 18, 19, 33 and 34 showed that fracture had occurred through failure of the bond while in tests 7, 12, 28 and 30 failure occurred completely through the parent metal by ductile shear while all other tests showed failure partly through the bond and partly through parent metal by ductile shear.

The tests show that grit blasting is superior to bead- and shot-blasting and to mechanical abrasion and that chemical cleaning before and after grit blasting improved cold peel strength although it had little effect on lap shear strength; also, the tests show that it is possible to obtain a diffusion bond between aluminium components that have strengths very similar to the strength of the parent metal.

The best peel strengths were obtained with bonding temperatures of 560° C. for 3 hours and bonding temperature and duration had a marked effect on the peel strength but little effect on the shear strength.

There is considerable variation, particularly in the peel strength, between tests conducted under the same parameters and this is due, we believe, to variations in the grit blasting conditions. Tests 35 to 39 were conducted under consistent grit blasting conditions and show that, under such conditions, diffusion bonds having shear strengths of 93% of the strength of the parent metal (tests 35 to 37) and cold peel strengths comparable to those of the parent metal (tests 27, 28 and 35 to 39) can be achieved. This is surprising in view of the fact that the process of the present invention does not completely eliminate aluminium oxide from the metal surface and in view of the inability of past proposals to provide bonds of such good strengths without substantial plastic deformation of the components.

example 2

Panels were produced as described above, i.e. by chemical cleaning/grit blasting/deoxidising sheets of alloy 8090 and diffusion bonding the sheets together except that a stop-off composition was applied to central areas of the sheets to prevent diffusion bonding in those areas; the panels so produced were subjected to superplastic forming. To achieve this, one of the sheets of each panel was provided with a hole in the stopped-off region, the edges of the bonded panel were clamped in a jig, which, together with the panel, formed a gas-tight chamber above the panel; the bonded panel was oriented such that the hole faces upwardly into the gas-tight chamber. The bonded panel was heated and pressurised gas fed into the chamber; the gas expanded the panel that did not have the hole to form a dome. Using these experimental conditions, strains in excess of 200% have been achieved without the diffusion bonds peeling.

EXAMPLE 3

Figure 3A:
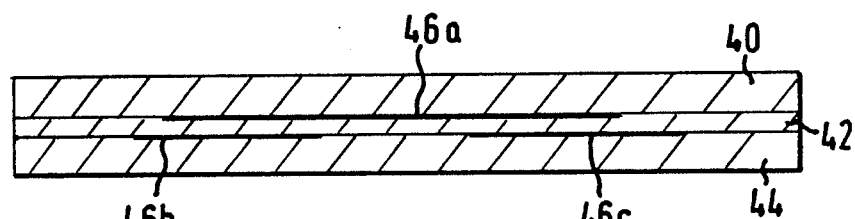
FIG. 3a is a cross-sectional view through a diffusion-bonded test panel produced by the process of the present invention.
Figure 3B:
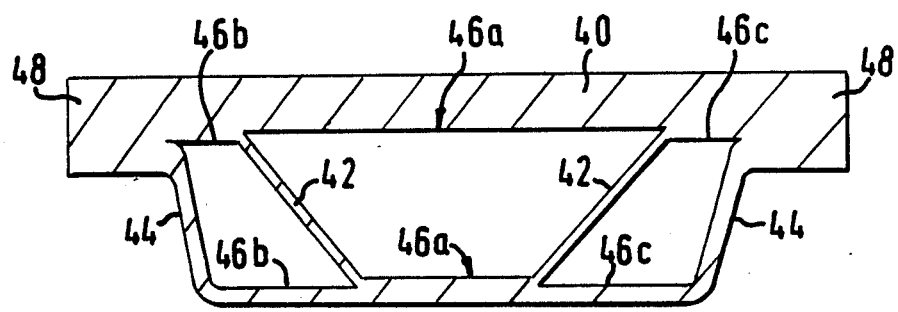

Refering to FIG. 3, three-sheet diffusion bonded test panels were formed by chemical cleaning/grit blasting-/deoxidation of three sheets of alloy 8090 as outlined above. The sheets 40, 42, 44 were arranged as shown in FIG. 3a with glass cloth being placed between the sheets in areas 46a top c to form a stop-off to prevent diffusion bonding between the sheets in those areas. The structure was then heated and compressed using the apparatus shown in FIG. 1 in order to diffusion bond the three sheets together except in those areas covered by glass cloth. The diffusion bonded panel is placed in a mould that clamps the edges 48 of the panel and pressurised gas is passed into the interior of the diffusion bonded panel until the panel takes on the shape of the interior of the mould; the thus formed panel is shown in FIG. 3b. The stopped-off areas in the finished panel are not diffusion bonded together and have consequently been expanded in the superplastic forming step to create three cavities within the panel. The diffusion bonding between the sheets is such that the interface between the original sheets where diffusion has taken place cannot be seen with the naked eye.

We claim:

1. A process of diffusion bonding components at least one of which is made of aluminium or an aluminium alloy and which is liable to form a surface coating of aluminium oxide, which process comprises grit blasting the components made of aluminium or aluminium alloy in areas that are to be bonded to other components, chemically treating the grit blasted components to remove surface aluminium oxide and subsequently heating and pressing the components together without substantial plastic deformation of the components to produce a diffusion bond.

2. A process as claimed in claim 1, wherein the components are pre-treated prior to grit blasting to remove the layer of aluminium oxide.

3. A process as claimed in claim 2, wherein the said pre-treatment comprises subjecting the components to an acid etch or a deoxidising solution.

4. A process as claimed in claim 3, wherein the acid used in the acid etch is selected from the group consisting of sulphuric and chromic acid.

5. A process as claimed in claim 1, wherein the chemical treatment step between the grit blasting step and the diffusion bonding step is performed with a deoxidising solution.

6. A process as claimed in claim 5, wherein the deoxidising solution is a non-chromated composition.

7. A process as claimed in claim 5, wherein the deoxidising solution is an acid.

8. A process as claimed in claim 7, wherein the deoxidising solution is a non-oxidising acid.

9. A process as claimed in claim 1, wherein the diffusion bonding is conducted at a temperature of 500° to 580° C. for 2 to 5

10. A process as claimed in claim 9, wherein the diffusion bonding is conducted at a temperature in the range of from 540° to 560° C.

11. A process of superplastically forming an article made from two or more components, at least one of which is made of aluminium or an aluminium alloy and which is liable to form a surface coating of aluminium oxide and at least one of which is capable of being superplastically formed, which process comprises grit blasting the components made of aluminium or aluminium alloy in areas that are to be bonded to other components, chemically treating the grit blasted components to remove surface aluminium oxide, applying stop-off material to areas of the components that is desired not to bond to other components (unbonded areas), subsequently heating and pressing the components together without substantial plastic deformation of the components to produce a composite structure having at least one unbonded area surrounded by at least one area in which the said components are joined together by diffusion bonding, heating the composite structure to a temperature at which superplastic forming can take place and introducing pressurised gas into the unbonded area to superplastically form the said composite into a desired shape.

12. A process as claimed in claim 11, wherein the components are pre-treated prior to grit blasting to remove the layer of aluminium oxide.

13. A process as claimed in claim 12, wherein the said pre-treatment comprises subjecting the components to an acid etch or a dexodising solution.

14. A process as claimed in claim 13, wherein the acid used in the acid etch is selected from the group consisting of sulphuric and chromic acid.

15. A process as claimed in claim 11, wherein the chemical treatment step between the grit blasting step and the diffusion bonding step is performed with a deoxidising solution.

16. A process as claimed in claim 15, wherein the deoxidising solution is a non-chromated composition.

17. A process as claimed in claim 15, wherein the deoxidising solution is an acid.

18. A process as claimed in claim 17, wherein the deoxidising solution is a non-oxidising acid.

19. A process as claimed in claim 11, wherein the diffusion bonding is conducted at a temperature of 500° to 580° C. for 2 to 5 hours.

20. The process as claimed in claim 19, wherein the diffusion bonding is conducted at a temperature in the range of from 540° to 560° C.

* * * * *